United States Patent
Li et al.

(10) Patent No.: US 11,727,855 B2
(45) Date of Patent: Aug. 15, 2023

(54) DISPLAY SYSTEM INCLUDING PLURALITY OF SOURCE DRIVERS, AND DRIVING METHOD THEREFOR

(71) Applicants: BEIJING BOE OPTOELECTRONICS TECHNOLOGY CO., LTD., Beijing (CN); BOE Technology Group Co., Ltd., Beijing (CN)

(72) Inventors: Meng Li, Beijing (CN); Rui Han, Beijing (CN); Jie Yu, Beijing (CN); Pengtao Li, Beijing (CN); Chunhua Wang, Beijing (CN); Xiaoqiao Dong, Beijing (CN); Tielei Zhao, Beijing (CN); Tingfeng Huang, Beijing (CN); Shulin Qin, Beijing (CN); Yaoyao Wang, Beijing (CN); Xiaoxia Wang, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/764,208

(22) PCT Filed: May 13, 2021

(86) PCT No.: PCT/CN2021/093613
§ 371 (c)(1),
(2) Date: Mar. 28, 2022

(87) PCT Pub. No.: WO2021/258901
PCT Pub. Date: Dec. 30, 2021

(65) Prior Publication Data
US 2022/0343831 A1    Oct. 27, 2022

(30) Foreign Application Priority Data

Jun. 22, 2020 (CN) .......................... 202010576677.5

(51) Int. Cl.
*G09G 3/3275* (2016.01)
*G09G 3/20* (2006.01)

(52) U.S. Cl.
CPC ....... *G09G 3/2096* (2013.01); *G09G 2310/08* (2013.01); *G09G 2360/04* (2013.01); *G09G 2370/10* (2013.01)

(58) Field of Classification Search
CPC ............. G09G 3/2096; G09G 2310/08; G09G 2360/04; G09G 2370/10
See application file for complete search history.

(56) References Cited

U.S. PATENT DOCUMENTS

2006/0208993 A1    9/2006  Jung
2009/0109201 A1    4/2009  Kim et al.
(Continued)

FOREIGN PATENT DOCUMENTS

CN         1786777 A       6/2006
CN       101425281 A       5/2009
(Continued)

OTHER PUBLICATIONS

International Search Report for PCT/CN2021/093613 dated Aug. 10, 2021.
(Continued)

*Primary Examiner* — Sanghyuk Park
(74) *Attorney, Agent, or Firm* — Ling Wu; Stephen Yang; Ling and Yang Intellectual Property (57) ABSTRACT

Provided is a display system, including one or more display screens (11, 12), a plurality of source drivers (13, 14), a timing controller (15) and a graphics processing unit (16). Each display screen (11, 12) is connected to one or more
(Continued)

source drivers (13, 14). The graphic processing unit (16) is connected to the timing controller (15). The timing controller (15) is connected to the plurality of source drivers (13, 14). The graphic processing unit (16) is configured to determine each image of the one or more display screens (11, 12) and transmit the image to the timing controller (15). The timing controller (15) is configured to divide each image of the one or more display screens (11, 12) into a plurality of sub-images in a P2P transmission manner, and output in parallel the corresponding sub-images to the plurality of source drivers (13, 14).

8 Claims, 5 Drawing Sheets

(56) References Cited

U.S. PATENT DOCUMENTS

| | | | |
|---|---|---|---|
| 2009/0140976 | A1 | 6/2009 | Bae et al. |
| 2010/0149082 | A1* | 6/2010 | Hong .................. G09G 3/3611 345/99 |
| 2013/0207944 | A1* | 8/2013 | Oohira ................. G09G 3/3685 345/204 |
| 2014/0063392 | A1 | 3/2014 | Gondo |
| 2014/0104249 | A1* | 4/2014 | Furihata .................. G09G 3/32 345/204 |
| 2016/0133178 | A1 | 5/2016 | Oh et al. |
| 2016/0163018 | A1* | 6/2016 | Wang .................... G06F 3/1423 345/504 |
| 2018/0018931 | A1 | 1/2018 | Zhang |
| 2018/0286315 | A1* | 10/2018 | Zhang ................. G09G 3/3266 |

FOREIGN PATENT DOCUMENTS

| | | |
|---|---|---|
| CN | 101447156 A | 6/2009 |
| CN | 103236243 A | 8/2013 |
| CN | 103703503 A | 4/2014 |
| CN | 105590576 A | 5/2016 |
| CN | 105653224 A | 6/2016 |
| CN | 109300442 A | 2/2019 |
| CN | 110136665 A | 8/2019 |
| CN | 111613186 A | 9/2020 |
| JP | 2000-322018 A | 11/2000 |
| JP | 2010-156846 A | 7/2010 |

OTHER PUBLICATIONS

The First Office Action dated Jun. 11, 2021 for Chinese Patent Application No. 202010576677.5 and English Translation.
The Second Office Action dated Jan. 11, 2022 for Chinese Patent Application No. 202010576677.5 and English Translation.
The Third Office Action dated Jun. 1, 2022 for Chinese Patent Application No. 202010576677.5 and English Translation.
Decision of Rejection dated Sep. 2, 2022 for Chinese Patent Application No. 202010576677.5 and English Translation.

* cited by examiner

DISPLAY SYSTEM INCLUDING PLURALITY OF SOURCE DRIVERS, AND DRIVING METHOD THEREFOR

CROSS-REFERENCE TO RELATED APPLICATIONS

The present application is a U.S. National Phase Entry of International Application No. PCT/CN2021/093613 having an international filing date of May 13, 2021, which claims priority to Chinese patent application No. 202010576677.5, filed to the CNIPA on Jun. 22, 2020 and entitled "Display system and driving method therefor". The above-identified applications are hereby incorporated by reference.

TECHNICAL FIELD

The present disclosure relates to, but is not limited to, the field of display technologies, in particular to a display system and a driving method therefor.

BACKGROUND TECHNOLOGY

With development of display technologies, multiple display screens need to be used for display in some scenes. For example, with development of automobile intelligence, a multi-screen trend in the field of on-board display is prominent. In addition to traditional central control display, demands for digital instruments, air conditioning display, rearview mirror display, transparent A-pillar display, rear seat entertainment display, window display, and so on, are growing rapidly.

SUMMARY

The following is a summary for subject matters described herein in detail. The summary is not intended to limit the scope of protection of claims.

Embodiments of the present disclosure provide a display system and a driving method therefor.

In one aspect, an embodiment of the present disclosure provides a display system, including: one or more display screens, a plurality of source drivers, a timing controller, and a graphics processor. Each display screen is connected with one or more source drivers. The graphics processor is connected with the timing controller. The timing controller is connected with the plurality of source drivers. The graphics processor is configured to determine each frame of image of the one or more display screens and transmit the image to the timing controller. The timing controller is configured to split the each frame of image of the one or more display screens into a plurality of sub-images through a Peer-to-Peer (P2P) transmission mode, and output corresponding sub-images to the plurality of source drivers in parallel. The plurality of source drivers are configured to provide data signals of the sub-images to the one or more display screens in parallel during any one line scan to enable the one or more display screens to display the image.

In another aspect, the present disclosure provides a driving method for a display system. The display system includes one or more display screens, a plurality of source drivers, a timing controller, and a graphics processor. Each display screen is connected with one or more source drivers. The graphics processor is connected with the timing controller. The timing controller is connected with the plurality of source drivers. The driving method includes: determining, by the graphics processor, each frame of image of the one or more display screens and transmitting the image to the timing controller; splitting, by the timing controller, the each frame of image of the one or more display screens into a plurality of sub-images through a P2P transmission mode and outputting corresponding sub-images to the plurality of source drivers in parallel; and providing, by the plurality of source drivers, data signals of the sub-images to the one or more display screens in parallel during any one line scan to enable the one or more display screens to display the image.

After the accompanying drawings and detailed descriptions are read and understood, other aspects may be understood.

BRIEF DESCRIPTION OF DRAWINGS

The accompany drawings are used for providing an understanding of technical solutions of the present disclosure, and form a part of the specification, and together with the embodiments of the present disclosure, are used for explaining the technical solutions of the present disclosure, and do not form limitations to the technical solutions of the present disclosure.

DETAILED DESCRIPTION

Multiple embodiments are described in the present disclosure. However, the description is exemplary and unrestrictive. Moreover, it is apparent to those of ordinary skills in the art that there may be more embodiments and implementation solutions in the scope of the embodiments described in the present disclosure. Although a number of possible combinations of features are shown in the drawings and discussed in the embodiments, many other combinations of the disclosed features are also possible. Unless expressly limited, any feature or element of any embodiment may be used in combination with, or may be used for replacing, any other feature or element in any other embodiment.

The present disclosure includes and conceives of combinations with the features and elements known to those of ordinary skill in the art. The embodiments, features, and elements disclosed in the present disclosure may also be combined with any conventional feature or element to form a unique solution defined by the claims. Any feature or element of any embodiment may also be combined with a feature or an element from another solution to form another unique solution defined by the claims. Therefore, it should be understood that any feature shown or discussed in the present disclosure may be implemented independently or in any appropriate combination. Therefore, the embodiments are not to be limited except limitations according to the appended claims and their equivalents. In addition, one or more modifications and alterations may be made within the protection scope of the appended claims.

In addition, when a representative embodiment is described, a method or a process may already be presented as a specific order of acts in the specification. However, to an extent that the method or the process does not depend on the specific order of the acts described herein, the method or the process should not be limited to the acts of the specific order described. Another order of acts may also be possible, as will be understood by those of ordinary in the art. Therefore, the specific order of the acts illustrated in the specification should not be interpreted as limitations on the claims. In addition, the claims with respect to the method or process should not be limited to the acts performed according to the order written. Those skilled in the art may easily understand that these orders may be changed, and are still maintained within the spirit and scope of the embodiments of the present disclosure.

In the accompanying drawings, a size of a constituent element, and a thickness of a layer or a region are sometimes exaggerated for clarity. Therefore, one implementation of the present disclosure is not necessarily limited to the size, and a shape and size of each component in the drawings do not reflect true proportions. In addition, the accompanying drawings schematically show ideal examples, and one implementation of the present disclosure is not limited to a shape, a numerical value, or the like shown in the accompanying drawings.

Unless otherwise defined, technical terms or scientific terms used in the present disclosure have same meanings as commonly understood by those of ordinary skills in the art to which the present disclosure belongs. "First", "second", and similar terms used in the present disclosure do not indicate any order, quantity, or importance, but are used only for distinguishing different components. In the present disclosure, a "plurality of" may refer to two or more than two. "Include", or "contain", and similar terms mean that an element or object appearing before the terms encompasses an element or object listed after the terms and their equivalents, and does not exclude other components or objects.

In the present disclosure, similar terms such as "connect", "couple", or "link" are not limited to physical or mechanical connections, but may include electrical connections, whether direct or indirect. An "electrical connection" includes a case where constituent elements are connected together through an element having some electrical function. There is no specific restriction on the "element having some electrical function" as long as it may transmit and receive electrical signals between connected constituent elements. Examples of the "element having some electrical action" include not only electrodes and wirings, but also switching elements such as transistors, and include resistors, inductors, capacitors, and other elements with one or more functions.

In the present disclosure, "parallel" refers to a state in which an angle formed by two straight lines is above −10° and below 10°, and thus may include a state in which the angle is above −5° and below 5°. In addition, "perpendicular" refers to a state that an angle formed by two straight lines is above 80° and below 100°, and thus may include a state that the angle is above 85° and below 95°.

For keeping the following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to conventional designs.

At least one embodiment of the present disclosure provides a display system including one or more display screens, a plurality of source drivers, a timing controller, and a graphics processor. Each display screen is connected with one or more source drivers. The graphics processor is connected with the timing controller. The timing controller is connected with the plurality of source drivers. The graphics processor is configured to determine each frame of image of one or more display screens and to transmit the image to the timing controller. The timing controller is configured to split each frame of image of one or more display screens into a plurality of sub-images through a Peer-to-Peer (P2P) transmission mode, and output corresponding sub-images to the plurality of source drivers in parallel. The plurality of source drivers are configured to provide data signals of sub-images to one or more display screens in parallel during any one line scan, so that the one or more display screens display images.

In some examples, a display system may include a plurality of display screens each of which may be connected with one or more source drivers. In this example, a display screen and a source driver may be in a one-to-one or one-to-many correspondence. In some examples, a display system may include a display screen and the display screen may be connected with a plurality of source drivers. In this example, a display screen and a source driver may be in a one-to-many correspondence.

In some examples, a display screen may be a Liquid Crystal Display (LCD). However, this embodiment is not limited thereto. For example, the display screen may be an Organic Light-Emitting Diode (OLED) display screen. In some examples, the plurality of display screens may be of the same type, e.g. all LCD, or the plurality of display screens may be partially of the same type.

In some examples, a timing controller may output a corresponding sub-image to each source driver. However, this embodiment is not limited thereto. In some examples, a timing controller may output multiple sub-images to one source driver.

In a display system according to an embodiment, one graphics processor may transmit each frame of image of one or more display screens to one timing controller, the one timing controller may output corresponding sub-images to a plurality of source drivers in parallel through a P2P transmission mode, the plurality of source drivers may provide data signals of corresponding sub-images to the display screens in parallel. Therefore, display control of multiple display screens or different display regions of a single display screen is achieved through one graphics processor and one timing controller, which may simplify complexity of the display system, save costs, and have good mass production. Moreover, the P2P transmission mode is used between the timing controller and the source drivers, which may reduce an interference of data transmission, and improve a transmission speed and security.

In some exemplary embodiments, a display system may include a plurality of display screens and at least two of the plurality of display screens may have different display resolutions. In some examples, display resolutions of a plurality of display screens may be different from each other, or display resolutions of a portion of a plurality of display screens may be the same and different from display resolutions of another portion of the display screens. However, this embodiment is not limited thereto.

In some exemplary embodiments, any display screen may be divided into a plurality of display regions each of which may be driven by one source driver. During any line scan of the display screen, a plurality of source drivers may provide data signals to each display region in parallel. In the exemplary embodiments, a plurality of source drivers may drive corresponding display regions in parallel.

In some exemplary embodiments, a timing controller may include a plurality of first P2P interfaces and each source driver may include at least one second P2P interface. A first P2P interface and a second P2P interface may be in a one-to-one correspondence, and are connected through a P2P transmission line pair. The timing controller may be configured to split each frame of image of one or more display screens into a plurality of sub-images through an amount of data transmitted through the plurality of first P2P interfaces, and output corresponding sub-images to a plurality of source drivers in parallel. A quantity of split sub-images may be the same as a quantity of the first P2P interfaces. The timing controller may be configured to output a sub-image to a corresponding source driver through a first P2P interface. In some examples, each source driver may include a second P2P interface. That is, sub-images may be transmitted between the timing controller and each source driver through a P2P transmission line pair. However, this embodiment is not limited thereto. For example, a source driver may include a plurality of second P2P interfaces, then sub-images transmission may be performed between the timing controller and the source driver through multiple P2P transmission line pairs, and the source driver may receive a plurality of sub-images. During one line scan, the source driver may sequentially provide data signals of the plurality of sub-images, that is, provide data signals of the plurality of sub-images to a corresponding display screen in a serial scan mode.

In some exemplary embodiments, the amount of data transmitted through the plurality of first P2P interfaces may be the same or different. In other words, sizes of the plurality of sub-images may be the same or different. In some examples, the amount of data transmitted by the plurality of first P2P interfaces may be pre-configured.

In some exemplary embodiments, a graphics processor may be configured to determine each frame of image of one or more display screens according to data received from one or more video image information sources and to transmit the image to a timing controller. In some examples, a graphics processor may be connected with a plurality of video image information sources, each of which may provide display image data of a display screen, or each video image information source may provide display image data corresponding to a display region of a display screen. For example, a video image information source may be an image pickup device or a storage device. However, this embodiment is not limited thereto. For example, a graphics processor may be connected with a video image information source that may provide display image data of one or more display screens. Exemplarily, a video image information source may be a storage device. In the exemplary embodiment, by adopting one graphics processor to provide each frame of image of one or more display screens, complexity of a display system may be simplified and costs may be saved.

In some exemplary embodiments, the display system of the embodiment may include a plurality of display screens. The plurality of display screens may be set independently. In some examples, the plurality of display screens may be placed in different locations respectively and used as separate display screens for display to achieve a variety of functional combinations. For example, in the field of on-board display, a plurality of display screens of a display system may be used respectively as any plurality of instrument display screens, air conditioning display screens, central control display screens, rear seat entertainment display screens, and rearview mirror display screens, etc. However, this embodiment is not limited thereto. In some examples, a plurality of display screens may be spliced into one large display screen.

Figure 1:
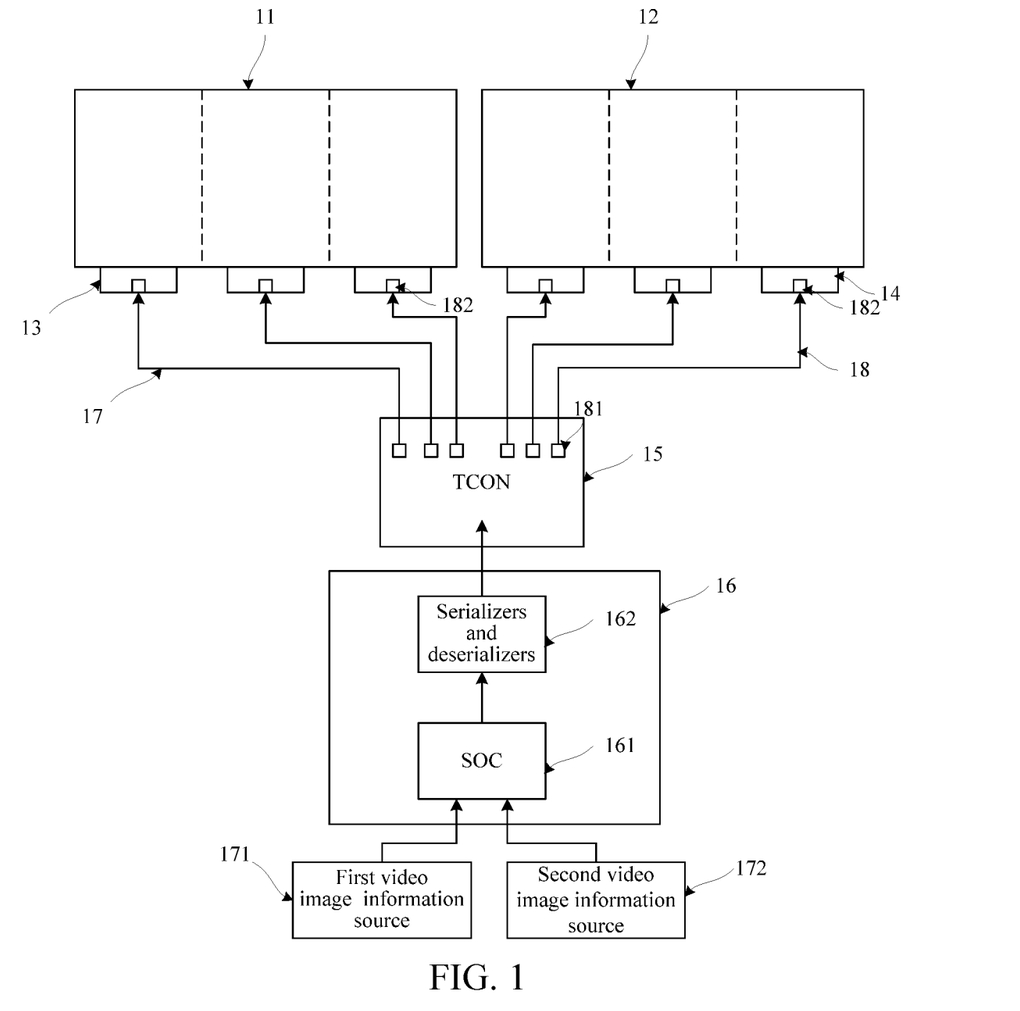
FIG. 1 is a schematic diagram of a display system according to at least one embodiment of the present disclosure.

FIG. 1 is a schematic diagram of a display system according to at least one embodiment of the present disclosure. As shown in FIG. 1, the display system according to the present embodiment may include: two display screens (e.g. a first display screen 11 and a second display screen 12), a plurality of source drivers (e.g. three first source drivers 13 and three second source drivers 14), one Timing Controller (TCON) 15, and one graphics processor 16. The graphics processor 16 is connected with the timing controller 15, the timing controller 15 is connected with the three first source drivers 13 and the three second source drivers 14, the three first source drivers 13 are connected with the first display screen 11, and the three second source drivers 14 are connected with the second display screen 12. In this exemplary embodiment, display screens and source drivers are in a one-to-many relationship. Quantities of display screens and source drivers are not limited in the embodiment.

In the exemplary embodiment, the first display screen 11 and the second display screen 12 may both be LCDs. However, this embodiment is not limited thereto.

In some exemplary embodiments, as shown in FIG. 1, the graphics processor 16 may be connected with two video image information sources (e.g. a first video image information source 171 and a second video image information source 172). In some examples, a video image information source may be an image pickup device or a storage device. The graphics processor 16 may include a System on Chip (SOC) 161 and a set of serializers and deserializers 162. For example, the System on Chip 161 may receive image data to be displayed on the first display screen 11 from the first video image information source 171, receive image data to be displayed on the second display screen 12 from the second video image information source 172, and perform physical splicing on a frame of image to be displayed on the first display screen 11 and a frame of image to be displayed on the second display screen 12 to obtain a frame of spliced image which is transmitted to the serializers and deserializers 162 for data format conversion (e.g., converted to a spliced image in a differential signal format); the serializers and deserializers 162 may transmit a frame of spliced image after format conversion to the timing controller 15 through an embedded Display Port (eDP) high-speed transmission interface. Physical splicing means performing splicing on multiple frames of images on a basis of not changing resolutions of the images. For example, multiple frames of images may be spliced along a row extension direction or spliced along a column extension direction. The graphics processor 16 may also provide a plurality of input control signals for controlling display, such as a vertical sync signal, a horizontal sync signal, and the like, to the timing controller 15.

In some examples, a System on Chip 161 may include a processor, a first scratchpad, a second scratchpad, and a third scratchpad. The first scratchpad may store image data received from the first video image information source 171 and the second scratchpad may store image data received from the second video image information source 172. The processor may splice data of a frame of image fetched from the first scratchpad and data of a frame of image fetched from the second scratchpad, and store obtained data of a frame of spliced image to the third scratchpad. However, this embodiment is not limited thereto.

In some exemplary embodiments, as shown in FIG. 1, a timing controller 15 may include six first P2P interfaces 181 and each source driver may include a second P2P interface 182. The first P2P interface 181 and the second P2P interface 182 are in a one-to-one correspondence, and are connected through a P2P transmission line pair 18. The P2P transmission line pair 18 connecting the first P2P interface 181 and the second P2P interface 182 may be used for transmitting a P2P differential signal to implement data transmission between a timing controller and a source driver. Independent data transmission may be performed between the timing controller 15 and each source driver. The timing controller 15 may split a frame of spliced image received from the graphics processor 16 into a plurality of sub-images through an amount of data transmitted through a plurality of first P2P interfaces 181, and a size of each split sub-image may match an amount of data transmitted through a corresponding first P2P interface 181. For example, the timing controller 15 supplies a frame of spliced image to a plurality of first P2P interfaces, and the plurality of first P2P interfaces determine an amount of image data to be transmitted according to an amount of data transmitted respectively, thereby achieving splitting of a spliced image. An amount of data transmitted through a first P2P interface 181 may be pre-configured. Amounts of data transmitted through the plurality of first P2P interfaces 181 may be the same or different. The timing controller 15 may transmit a sub-image to a source driver through a P2P transmission line pair. In the exemplary embodiment, the timing controller 15 may split a frame of spliced image received through six first P2P interfaces into six sub-images, and independently transmit each sub-image to a corresponding source driver through a P2P transmission line pair. In the exemplary embodiment, a P2P transmission mode is adopted for data transmission between a timing controller and a source driver, which may reduce an interference of data transmission and improve a transmission speed and security.

In the exemplary embodiment, data transmitted through each first P2P interface may include a frame header, a sub-image, and a frame tail. The frame header may include a system configuration parameter, such as a synchronization parameter and a frame data start flag parameter. In order to achieve independent parallel transmission between a timing controller and a source driver through a P2P transmission mode, a synchronization parameter between a plurality of first P2P interfaces may be canceled (for example, set to null), that is, each first P2P interface will not receive a sync signal of a previous first P2P interface, and each first P2P interface may independently perform data transmission. The frame data start flag parameter may be set as a rising edge or a falling edge of a frame sync signal. When a frame sync signal comes, a plurality of first P2P interfaces simultaneously start to transmit sub-images. An amount of data transmitted through each first P2P interface may be set according to a designed amount of each first P2P interface and an amount of data that needs to be sent to a source driver. For example, an amount of data transmitted through each first P2P interface may be less than a designed amount of a first P2P interface and less than or equal to an amount of data that needs to be sent to a source driver. The frame tail may include a termination flag and check information.

In some examples, taking a frame of image with a resolution of 1920RGB*720 received by a timing controller as an example, when the timing controller includes three first P2P interfaces, then a first P2P interface may transmit a sub-image with a resolution of 1920*720 (that is, data from columns 1 to 1920 in the image with the resolution of 1920RGB*720), a second first P2P interface may transmit a sub-image with a resolution of 1920*720 (i.e., data from columns 1921 to 3840 in the image with the resolution of 1920RGB*720), and a third first P2P interface may transmit a sub-image with a resolution of 1920*720 (i.e., data from columns 3841 to 5760 in the image with the resolution of 1920RGB*720). Furthermore, the three first P2P interfaces may transmit corresponding sub-images in parallel.

In the exemplary embodiment, both a first display screen 11 and a second display screen 12 may include: a plurality of gate lines, a plurality of data lines, and a plurality of pixels. A plurality of gate lines and a plurality of data lines are intersected, the plurality of gate lines may be extended in a row direction and parallel to each other, and the plurality of data lines may be extended in a column direction and parallel to each other. A plurality of pixels may be connected to a gate line and a data line respectively and arranged in an array. A display system of the exemplary embodiment may further include: a plurality of gate drivers which connected with the first display screen 11 and the second display screen 12 respectively. A gate driver may be connected with a plurality of gate lines and transmit gate signals to pixels through a plurality of gate lines. Each source driver may be connected with a plurality of data lines through which data signals are transmitted to pixels.

In some exemplary embodiments, as shown in FIG. 1, a first display screen 11 and a second display screen 12 may be respectively divided into three display regions, each display region of the first display screen 11 corresponds to a first source driver 13, and each display region of the second display screen 12 corresponds to a second source driver 14. That is, each first source drivers 13 may be connected with a data line in a display region within the first display screen 11 and provide a data signal to the display region. Each second source driver 14 may be connected with a data line within a display region within the second display screen 12 and provide a data signal to the display region.

In some exemplary embodiments, as shown in FIG. 1, a timing controller 15 may be connected with a plurality of gate drivers, three first source drivers 13, and three second source drivers 14 respectively, and may provide gate control signals to the gate drivers, and data control signals and corresponding sub-images to the first source drivers 13 and the second source drivers 14. After the three first source drivers 13 and the three second source drivers 14 respectively receive the corresponding sub-images, display regions of a first display screen 11 and a second display screen 12 may be driven in parallel to display the corresponding sub-images respectively, so that each frame of image is completely displayed on the first display screen 11 and the second display screen 12.

Figure 2:
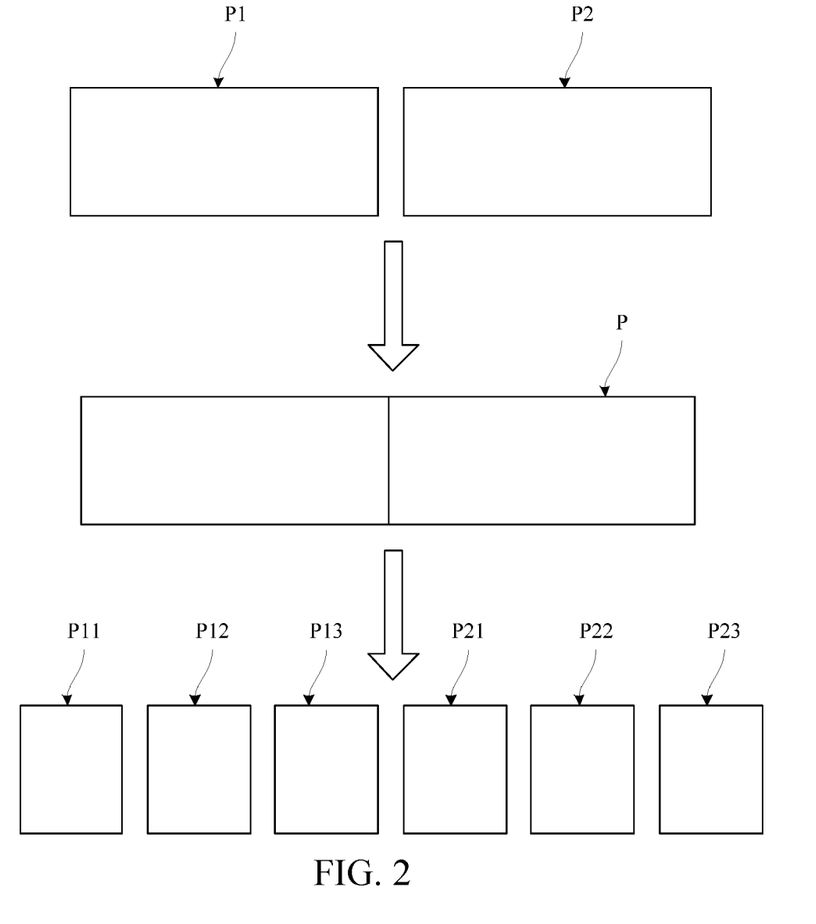
FIG. 2 is a schematic diagram of an image data processing procedure of the display system shown in FIG. 1.

FIG. 2 is a schematic diagram of an image data processing of the display system shown in FIG. 1. The following description will be given by taking as an example that display resolutions of a first display screen 11 and a second display screen 12 are both 1920RGB*720 (i.e., 5760*720). A total display resolution of the first display screen 11 and the second display screen 12 is 3840RGB*720. As shown in FIG. 2, a graphics processor 16 may splice a first image P1 with a resolution of 1920RGB*720 to be displayed on the first display screen 11 and a second image P2 with a resolution of 1920RGB*720 to be displayed on the second display screen 12 into a frame of spliced image P with a resolution of 3840RGB*720, and transmit the spliced image P to a timing controller 15. The graphics processor 16 physically splices the first image P1 and the second image P2 having a same resolution, that is, splices the first image P1 and the second image P2 along a row extension direction on a basis of not changing the resolution of the first image P1 and the second image P2. The timing controller 15 may split the spliced image P into six sub-images with a resolution of 1920*720 through six first P2P interfaces 181 and synchronously transmit them to corresponding source drivers in parallel. Each source driver may receive a corresponding sub-image independently. The first image P1 may be split into a first sub-image P11, a second sub-image P12, and a third sub-image P13, and the second image P2 may be split into a fourth sub-image P21, a fifth sub-image P22, and a sixth sub-image P23.

Taking the first display screen 11 as an example, the first display screen 11 may include 720 gate lines and 5760 data lines. The first display screen 11 is equally divided into three display regions each of which may include 720 gate lines and 1920 data lines. After receiving a sub-image, each first source driver 13 may independently provide data signals to 1920 data lines in a corresponding display region. The three first source drivers 13 and the three second source drivers 14 may drive the display screen 11 and the second display screen 12 in parallel to perform image display. The first sub-image P11, the second sub-image P12, and the third sub-image P13 may be simultaneously displayed on the first display screen 11, and the fourth sub-image P21, the fifth sub-image P22, and the sixth sub-image P23 may be simultaneously displayed on the second display screen 12. In this way, a first image and a second image with a resolution of 1920RGB*720 may be completely displayed on the first display screen 11 and the second display screen 12, respectively.

Figure 3:
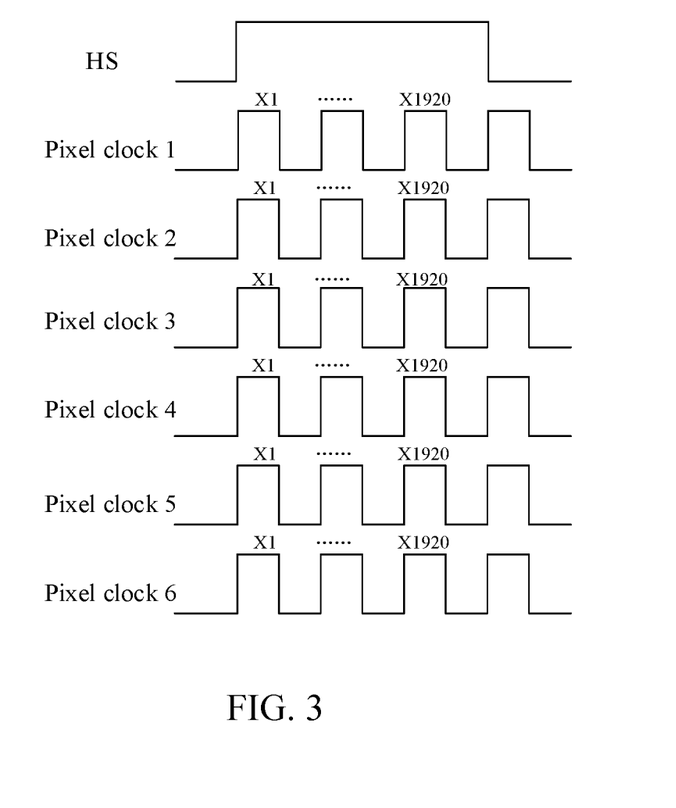
FIG. 3 is a timing diagram of one line scan of the display system shown in FIG. 1.

FIG. 3 is a timing diagram of one line scan of the display system shown in FIG. 1. As shown in FIGS. 1 and 3, six source drivers (i.e., three first source drivers 13 and three second source drivers 14) may scan from a first data line X1 to a 1920th data line X1920 to which they are connected, respectively, after one line scan is started according to a Horizontal Sync signal (HS). Pixel clocks 1 to 6 correspond to scan timing of the six source drivers, respectively. As may be seen from FIG. 3, during one line scan, six source drivers may scan in parallel without affecting each other. Scans of the three first source drivers 13 are spliced together to form a complete line scan of a first display screen 11; scans of the three second source drivers 14 are spliced together to form a complete line scan of a second display screen 12. In the exemplary embodiment, an actual scanning duration of one line of the three first source drivers 13 is ⅓ of a scanning duration of all data lines of the first display screen 11, and a reserved ⅔ duration may be used as a splicing time error. Likewise, an actual scanning duration of one line of the three second source drivers 14 is ⅓ of a scanning duration of all data lines of the second display screen 12, and a reserved ⅔ duration may be used as a splicing time error. Within a line scan time range, a human eye will not perceive abnormality of picture display, which may ensure a display effect of a display system.

Compared with a serial scanning mode of three source drivers of a display screen (that is, to complete a line scan, the scan needs to be performed from a first data line X1 to a last data line of a display screen, and a plurality of source drivers need to complete serial scanning of data through a sync signal), in the exemplary embodiment, each source driver may be used as an independent unit to perform data driving on the display screen without affecting each other, and may support achievement of unified control of a plurality of display screens. Moreover, in a serial scanning mode of a plurality of source drivers, each source driver needs to receive a complete image of a corresponding display screen. Compared with this, a source driver of the embodiment only needs to receive a sub-image driven independently, which may reduce an amount of data transmission and processing, and simplify complexity of a display system.

In the exemplary embodiment, a graphics processor and a timing controller are used for controlling two display screens, which may simplify complexity of a display system, save costs, and have good mass production. In some examples, a display system of the present embodiment may be applied to the field of on-board display, for example, the first display screen 11 and the second display screen 12 may be used as an instrument display screen and a central control display screen respectively. In some examples, a display system of the present embodiment may be applied to the field of exhibition hall or video conference display and the first display screen 11 and the second display screen 12 may be integrally spliced as one large display screen.

Figure 4:
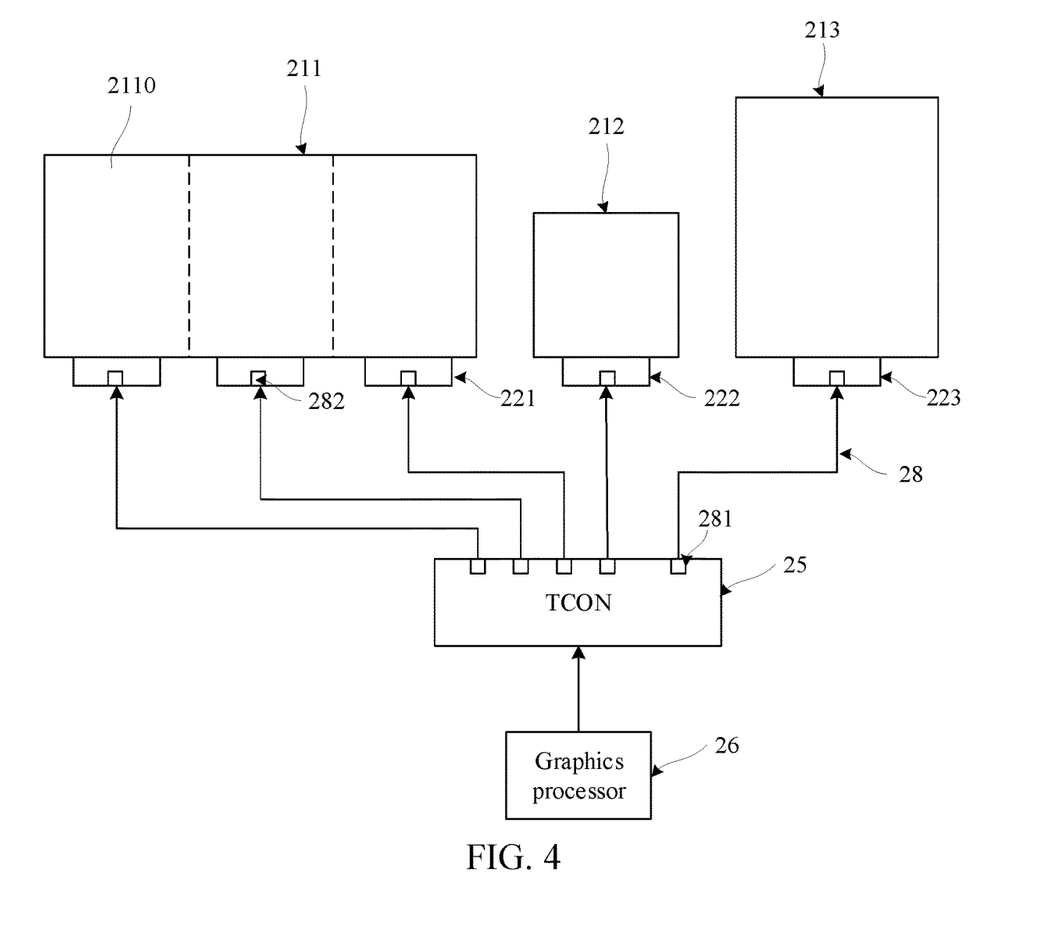
FIG. 4 is another schematic diagram of a display system according to at least one embodiment of the present disclosure.

FIG. 4 is another schematic diagram of a display system according to at least one embodiment of the present disclosure. As shown in FIG. 4, a display system of an exemplary embodiment may include: three display screens (e.g. a first display screen 211, a second display screen 212, and a third display screen 213), a plurality of source drivers (e.g. three first source drivers 221, one second source driver 222, and one third source driver 223), a gate driver (not shown in the figure), one timing controller 25, and one graphics processor 26. The graphics processor 26 is connected with the timing controller 25; the timing controller 25 is connected with the three first source drivers 221, the one second source driver 222, and the one third source driver 223 respectively; the three first source drivers 221 are connected with the first display screen 211, the second source driver 222 is connected with the second display screen 212, and the third source driver 223 is connected with the third display screen 213. The first display screen 211 is divided into three display regions 2110, and the display regions 2110 are in a one-to-one correspondence with the first source drivers 221. In the exemplary embodiment, display screens and source drivers are in a one-to-one or one-to-many relationship. Quantities of display screens and source drivers are not limited in the embodiment.

In the exemplary embodiment, display resolutions of the first display 211, the second display 212, and the third display 213 may be different. For example, a display resolution of the first display screen 211 may be 1920RGB*720, a display resolution of the second display screen 212 may be 640RGB*200, and a display resolution of the third display screen 213 may be 960RGB*1080.

In some exemplary embodiments, as shown in FIG. 4, the timing controller 25 includes five first P2P interfaces 281 and each source driver includes a second P2P interface 282. A first P2P interface 281 and the second P2P interface 282 are in a one-to-one correspondence, and are connected through a P2P transmission line pair 28.

In some examples, the graphics processor 26 may receive image data to be displayed on the first display 211, the second display 212, and the third display 213 from three video image information sources. Each video image information source may provide image data to be displayed on a display screen. However, this embodiment is not limited thereto. For example, a graphics processor may receive image data to be displayed on the first display screen 211 from three video image information sources, each video image information source may provide image data to be displayed in one display region 2110 of the first display screen 211. For example, a graphics processor may receive image data to be displayed on the second display 212 and the third display 213 from a video image information source.

In some exemplary embodiments, as shown in FIG. 4, the graphics processor 26 may splice a frame of image with a resolution of 1920RGB*720 to be displayed on the first display screen 211, a frame of image with a resolution of 640RGB*200 to be displayed on the second display screen 212, and a frame of image with a resolution of 960RGB*1080 to be displayed on the third display screen 213, and transmit a spliced image to the timing controller 25. The graphics processor 26 physically splices three images with different resolutions. The timing controller 25 may split a received frame of spliced image into five sub-images through the five first P2P interfaces 281, and the five sub-images correspond to three display regions 2110 of the first display screen 211, the second display screen 212, and the third display screen 213, respectively. Sizes of the five sub-images are different. The timing controller 25 may synchronously transmit the five sub-images in parallel to five source drivers (i.e. three first source drivers 221, one second source driver 222, and one third source driver 223) through the five first P2P interfaces 281. Each source driver may independently receive one sub-image, respectively, and drive a corresponding display region or display screen in parallel to display the sub-image. In this way, three display screens with different display resolutions may be uniformly controlled to display independently through one graphics processor and one timing controller, thereby simplifying complexity of a display system, saving costs, and having good mass production.

In the exemplary embodiment, when one line scan is started according to a Horizontal Sync signal (HS), the three first source drivers 221 may scan from a first data line X1 to a 1920th data line X1920 to which they are connected respectively, the second source driver 222 may scan from a first data line to a 1920th data line to which it is connected, and the third source driver 223 may scan from a first data line to a 2880th data line to which it is connected. During one line scan, the five source drivers may scan in parallel without affecting each other.

In some examples, the display system according to the exemplary embodiment may be applied to the field of on-board display and three display screens may be used for display as independent display screens. For example, the first display screen 211 may be used as an instrument display screen, the second display screen 212 may be used as an air conditioning display screen, and the third display screen 213 may be used as a central control display screen. In this way, control resources of an on-board display system may be saved, use of devices may be reduced, costs may be saved, and it is conducive to increase of a quantity and area of on-board display screens.

For other related descriptions of the display system of this embodiment, reference may be made to the descriptions of the above-mentioned embodiments, and thus will not be repeated here.

Figure 5:
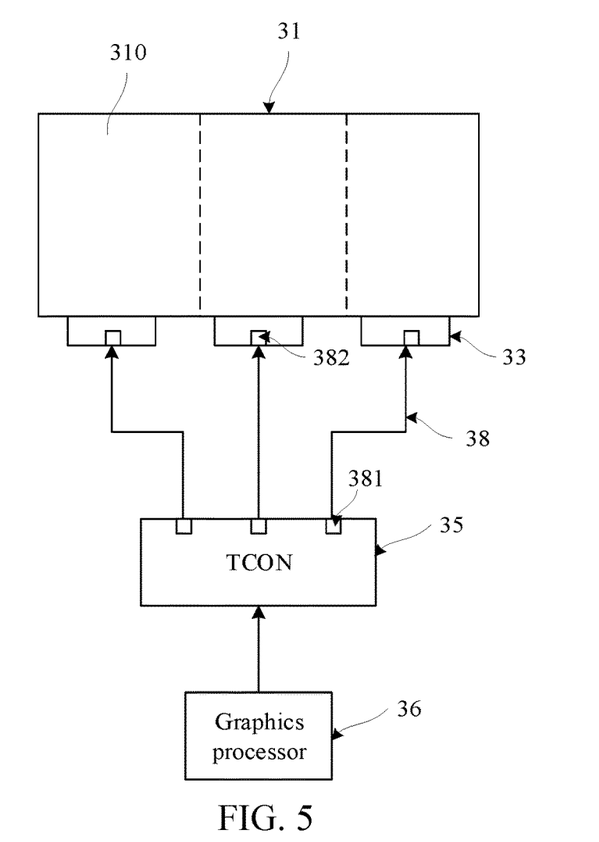
FIG. 5 is yet another schematic diagram of a display system according to at least one embodiment of the present disclosure.

FIG. 5 is another schematic diagram of a display system according to at least one embodiment of the present disclosure. As shown in FIG. 5, a display system of an exemplary embodiment may include: one display screen 31, three source drivers 33, a gate driver (not shown in the figure), one timing controller 35, and one graphics processor 36. The graphics processor 36 is connected with the timing controller 35, the timing controller 35 is connected with the three source drivers 33, and the three source drivers 33 are connected with the display screen 31. In the exemplary embodiment, a display screen and source drivers are in a one-to-three relationship. A quantity of source drivers is not limited in the embodiment.

In the exemplary embodiment, the display screen 31 may be equally divided into three display regions 310 and display resolutions of the three display regions may be the same. However, this embodiment is not limited thereto. In some examples, the display screen 31 may be divided into a plurality of display regions with different display resolutions and each display region is connected with one source driver.

In the exemplary embodiment, the graphics processor 36 may receive image data to be displayed on the display screen 31 from three video image information sources, each video image information source may provide image data to be displayed in one display region 310. However, this embodiment is not limited thereto. For example, a graphics processor may receive image data to be displayed on the display screen 31 from one video image information source, or may receive image data to be displayed on the display screen 31 from two video image information sources.

In the exemplary embodiment, the graphics processor 36 may transmit an image (e.g. a resolution of which is 1920RGB*720) to be displayed on the display screen 31 to the timing controller 35. The timing controller 35 may split a received image into three sub-images through three first P2P interfaces 381 and synchronously transmit the three sub-images to three source drivers 33 through three P2P transmission line pairs 38 in parallel. Each source driver 33 may receive one sub-image through a second P2P interface 382. For example, a resolution of each sub-image may be 1920*720. During one line scan, the three source drivers 33 may drive corresponding display regions 310 in parallel to display sub-images. A complete frame of image with a resolution of 1920RGB*720 may be displayed on the display screen 31.

In the exemplary embodiment, each source driver may be used as an independent unit to perform data driving on a display screen without affecting each other, which may support achievement of unified control of a plurality of display regions of a single display screen, may improve a display effect and save costs.

For other related descriptions of the display system of this embodiment, reference may be made to the descriptions of the above-mentioned embodiments, and thus will not be repeated here.

Figure 6:
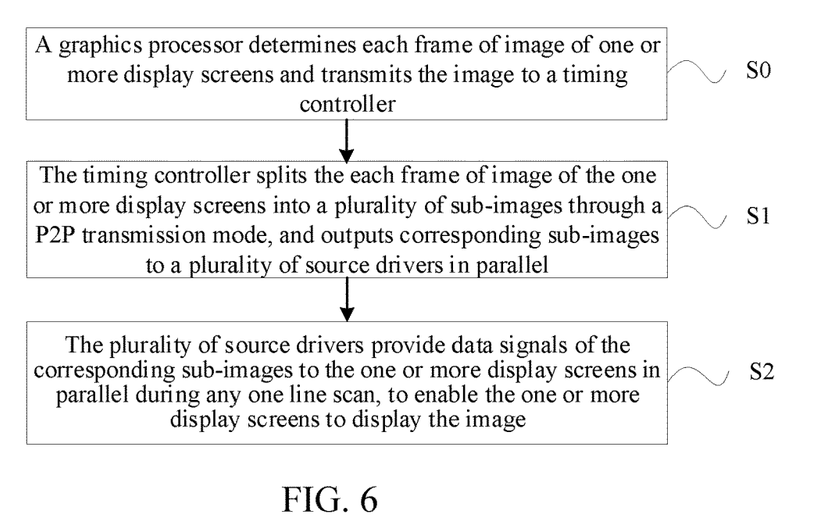
FIG. 6 is a flowchart of a driving method of a display system according to at least one embodiment of the present disclosure.

FIG. 6 is a flowchart of a driving method of a display system according to at least one embodiment of the present disclosure. In this embodiment, the display system may include: one or more display screens, a plurality of source drivers, one timing controller, and one graphics processor. Each display screen is connected with one or more source drivers. The graphics processor is connected with the timing controller. The timing controller is connected with the plurality of source drivers.

As shown in FIG. 6, the driving method of the display system of the present embodiment may include acts S0 to S2.

In act S0, a graphics processor determines each frame of image of one or more display screens and transmits the image to a timing controller.

In act S1, the timing controller splits the each frame of image of the one or more display screens into a plurality of sub-images through a P2P transmission mode, and outputs corresponding sub-images to a plurality of source drivers in parallel.

In act S2, the plurality of source drivers provide data signals of sub-images to the one or more display screens in parallel during any one line scan, to enable one or more display screens to display the image.

In some exemplary embodiments, the display system may include a plurality of display screens, and at least two display screens of the plurality of display screens have different display resolutions.

In some exemplary embodiments, a display screen may be divided into a plurality of display regions, each display region may be driven by one source driver. The act S2 may include: during any one line scan of the display screen, the plurality of source drivers provide data signals to corresponding display regions in parallel.

In some exemplary embodiments, a timing controller may include a plurality of first P2P interfaces, each source driver may include at least one second P2P interface, a first P2P interface and a second P2P interface are in a one-to-one correspondence, and are connected through a P2P transmission line pair. The act S1 may include: the timing controller splits each frame of image of one or more display screens into a plurality of sub-images through amounts of data transmitted by a plurality of first P2P interfaces, and outputs corresponding sub-images to a plurality of source drivers in parallel; wherein, a quantity of split sub-images is the same as a quantity of the first P2P interfaces.

In the driving method of the display system according to the embodiment, one graphics processor may transmit each frame of image of one or more display screens to one timing controller, the one timing controller may output corresponding sub-images to a plurality of source drivers in parallel through a P2P transmission mode, the plurality of source drivers may provide data signals of corresponding sub-images to the display screens in parallel. Therefore, display control of a plurality of display screens or different display regions of a single display screen is achieved through one graphics processor and one timing controller, which may simplify complexity of the display system, save costs, and have good mass production. Moreover, a P2P transmission mode is adopted between a timing controller and a source driver, which may reduce an interference of data transmission, and improve a transmission speed and security. For relevant description of the driving method of this embodiment, reference may be made to the description of the above-mentioned embodiments, and thus will not be repeated here.

Although the embodiments disclosed in the present disclosure are as above, the described contents are only embodiments adopted for convenience of understanding the present disclosure and are not intended to limit the present disclosure. Any skilled person in the art to which the present disclosure pertains may make any modifications and variations in implementation manners and details without departing from the spirit and scope of the present disclosure. However, the protection scope of the present disclosure should be subject to the scope defined by the appended claims.

The invention claimed is:

1. A display system, comprising:
one or more display screens, a plurality of source drivers, a timing controller, and a graphics processor, wherein each display screen is connected with one or more of the source drivers; the graphics processor is connected with the timing controller; the timing controller is connected with the plurality of source drivers;
the graphics processor is configured to determine each frame of image of the one or more display screens and transmit the image to the timing controller;
the timing controller is configured to split the each frame of image of the one or more display screens into a plurality of sub-images through a Peer-to-Peer (P2P) transmission mode and output corresponding sub-images to the plurality of source drivers in parallel;
the plurality of source drivers are configured to provide data signals of the sub-images to the one or more display screens in parallel during any one line scan to enable the one or more display screens to display the image;
the timing controller comprises a plurality of first P2P interfaces, each source driver comprises at least one second P2P interface, a first P2P interface and a second P2P interface are in a one-to-one correspondence, and are connected through a P2P transmission line pair; and
the timing controller is configured to split each frame of image of the one or more display screens into a plurality of sub-images through amounts of data transmitted by the plurality of first P2P interfaces, and output corresponding sub-images to the plurality of source drivers in parallel; a quantity of split sub-images is the same as a quantity of the first P2P interfaces.

2. The display system according to claim 1, wherein the display screens are a plurality of display screens, and at least two display screen among the plurality of display screens have different display resolutions.

3. The display system according to claim 1, wherein the amounts of data transmitted by the plurality of first P2P interfaces are the same or different.

4. The display system according to claim 1, wherein the display screens are a plurality of display screens and the plurality of display screens are independently arranged.

5. The display system according to claim 1, wherein the display screen is divided into a plurality of display regions, each display region is driven by one source driver; during any one line scan of the display screen, the plurality of source drivers provide data signals to corresponding display regions in parallel.

6. A driving method for a display system, wherein the display system comprises one or more display screens, a plurality of source drivers, a timing controller, and a graphics processor; each display screen is connected with one or more source drivers; the graphics processor is connected with the timing controller; the timing controller is connected with the plurality of source drivers;
the driving method comprises:
determining, by the graphics processor, each frame of image of the one or more display screens and transmitting the image to the timing controller;
splitting, by the timing controller, the each frame of image of the one or more display screens into a plurality of sub-images through a Peer-to-Peer (P2P) transmission mode and outputting corresponding sub-images to the plurality of source drivers in parallel; and
providing, by the plurality of source drivers, data signals of the sub-images to the one or more display screens in parallel during any one line scan to enable the one or more display screens to display the image;
wherein the timing controller comprises a plurality of first P2P interfaces, each source driver comprises at least one second P2P interface, a first P2P interface and the second P2P interface are in a one-to-one correspondence, and are connected through a P2P transmission line pair; wherein splitting, by the timing controller, the each frame of image of the one or more display screens into the plurality of sub-images through the P2P transmission mode and outputting corresponding sub-images to the plurality of source drivers in parallel, comprises: splitting, by the timing controller, the each frame of image of the one or more display screens into the plurality of sub-images through amounts of data transmitted by the plurality of first P2P interfaces, and outputting corresponding sub-images to the plurality of source drivers in parallel, wherein a quantity of split sub-images is the same as a quantity of the first P2P interfaces.

7. The driving method according to claim 6, wherein the display screens are a plurality of display screens, and at least two display screens among the plurality of display screens have different display resolutions.

8. The driving method according to claim 6, wherein the display screen is divided into a plurality of display regions, each display region is driven by one source driver; wherein providing, by the plurality of source drivers, the data signals of the sub-images to the one or more display screens in parallel during any one line scan, comprises: providing, by the plurality of source drivers, data signals to corresponding display regions in parallel during any one line scan of the display screen.

\* \* \* \* \*